(12) United States Patent
Kaufman et al.

(10) Patent No.: US 7,099,141 B1
(45) Date of Patent: Aug. 29, 2006

(54) CERAMIC CAPACITOR EXHIBITING GRACEFUL FAILURE BY SELF-CLEARING, METHOD FOR FABRICATING SELF-CLEARING CAPACITOR

(75) Inventors: David Y. Kaufman, Chicago, IL (US); Sanjib Saha, Santa Clara, CA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 11/145,220

(22) Filed: Jun. 6, 2005

(51) Int. Cl.
*H01G 4/06* (2006.01)
*H01G 2/00* (2006.01)
*H01G 4/30* (2006.01)

(52) U.S. Cl. .................. 361/311; 361/275.1; 361/301.4

(58) Field of Classification Search ................ 361/272, 361/275.1, 275.2, 275.3, 275.4, 301.4, 311, 361/320, 321.1, 321.5; 29/25.42
See application file for complete search history.

(56) References Cited

U.S. PATENT DOCUMENTS

| 4,433,359 A | 2/1984 | Hamabe et al. |
| 4,680,670 A | 7/1987 | Chan |
| 4,720,767 A | 1/1988 | Chan et al. |
| 4,894,746 A | 1/1990 | Mori et al. |

FOREIGN PATENT DOCUMENTS

JP          09045581 A   *   2/1997

* cited by examiner

*Primary Examiner*—Eric W. Thomas
(74) *Attorney, Agent, or Firm*—Bradley W. Smith; Mark P. Dvorscak; Paul A. Gottlieb

(57) ABSTRACT

A short-resistant capacitor comprises an electrically conductive planar support substrate having a first thickness, a ceramic film deposited over the support substrate, thereby defining a ceramic surface; and a metallic film deposited over the ceramic surface, said film having a second thickness which is less than the first thickness and which is between 0.01 and 0.1 microns.

19 Claims, 4 Drawing Sheets

US 7,099,141 B1

CERAMIC CAPACITOR EXHIBITING GRACEFUL FAILURE BY SELF-CLEARING, METHOD FOR FABRICATING SELF-CLEARING CAPACITOR

The U.S. Government has rights in this invention pursuant to Contract No. W-31-I09-ENG-38 between the U.S. Department of Energy and The University of Chicago representing Argonne National Laboratory.

BACKGROUND OF THE INVENTION

1. Field of the Invention

This invention relates to the field of capacitors with a long failure time, and more specifically this invention relates to a ceramic capacitor which fails gracefully so as to exhibit a gradual a loss of capacitance.

2. Background of the Invention

A capacitor is used to store electrical charge, or, equivalently, electrical energy. A capacitor can also function as a filter by passing alternating current (AC) while blocking direct current (DC). Capacitors also can serve as a source of instantaneous released energy, or to prevent current and voltage transients across batteries. Typically, a capacitor comprises two electrode plates facing each other, with an insulating dielectric between the plates.

Prior art capacitors are prone to catastrophic failure, especially when the dielectric is a ceramic. At high voltages, dielectric breakdown can occur due to either extrinsic effects (e.g. material defects or porosity), or intrinsic effects (e.g. thermal runaway). When breakdown occurs, there is an in-rush of current across the defect region causing a short circuit across the capacitor. After breakdown the entire capacitor can no longer hold charge and cannot function as a charge storage device. For many applications, this short circuit is harmful to other components in the circuit and can result in catastrophic damage. Efforts have been made to minimize catastrophic damage to circuit components due to capacitor failure. Capacitors which fail "gracefully" instead of catastrophically have been attempted. Capacitors which exhibit graceful failure ideally undergo a miniscule loss of capacitance when a failure occurs. The objective is to allow several isolated failure events to occur before an appreciable loss of capacitance is experienced. This would confer better circuit stability, and extend useful life for the circuit.

Graceful failure has been attempted in metallized polymer capacitors. These designs comprise a polymer film on both sides of which thin layers of metal are deposited. The polymer film provides mechanical support for the two electrodes. (See U.S. Pat. No. 4,433,359 to Hanabe et al.)

Typical ceramic capacitors have dielectrics on the order of 1 micron thick with metal electrodes of the same thickness. Ceramic dielectrics are preferable for use in many capacitors applications because they have much higher dielectric constants and therefore higher energy densities than polymer capacitors. Air exhibits a dielectric constant (also known as "permeability") very close to 1. Polymers have a relative permeability (relative to air) of between 1 and 6. Ceramic dielectrics, particularly ferroelectric materials, have a relative permeability of between 30 and 100,000.

The high dielectric constant of ceramic capacitors makes them particularly suitable in high frequency applications such as decoupling capacitors in microelectronics and filters in mobile communication. Capacitors with ceramic dielectrics can be operated at higher temperatures than polymer capacitors. Additionally, they can accommodate higher ripple currents. Ceramic capacitors are also better suited for high frequency applications.

Graceful failure has not been extensively shown in ceramic capacitors. This is because ceramic dielectrics of a thickness similar to that of a typical polymer capacitor are too brittle to provide the support structure for a capacitor. Also, the higher dielectric capacities of ceramics result in higher charges being stored, therefore increasing the potential for short circuiting or other failure.

A few designs have demonstrated graceful failure for ceramic capacitors but such designs rely on an internal thin metal self-fusing strip. This design mimics fusing strips in certain polymer capacitor designs. These strips are not easily amenable to large-scale manufacturing as they rely on the use of a thin segment often not fabricated in a similar manner as the main bodies of the electrodes. (See for instance U.S. Pat. No. 4,894,746 to Mori et al., U.S. Pat. No. 4,720,767 to Chan et al., and U.S. Pat. No. 4,680,670 to Chan.)

FIG. 1 illustrates in principle the state of the art electrode configuration for a capacitor having fusing strips. It duplicates in part FIGS. 5A and 5B in U.S. Pat. No. 4,720,767. An electrode 11 (placed below electrode 14) comprises two electrode segments 13a and 13b overlying dielectric material "D". The electrodes 13a, 13b are connected by fusing strips 19a, 19b to voltage terminals 33a and 33b which are at the same potential. When a voltage breakdown occurs between electrodes 14 and 11 (say above 13a), there is a short-circuit across the capacitor and therefore a surge of current in the corresponding electrode segment 13a such that the connecting fusing strip 19a is melted. This disconnects the whole electrode segment 13a where the breakdown occurred from the voltage terminal 33a. Consequently, since one of two electrode segments is disconnected, an appreciable and significant loss of capacitance occurs.

A need exists in the art for an improved ceramic capacitor which does not fail short and result in a short circuit. The capacitor should obviate the need for fusing strips and other intricate electrode designs and should instead incorporate uniform electrode configurations to minimize the cost of fabrication. The electrodes should be such that only the localized, defective area of an electrode, and not the entire electrode, is removed from the capacitor structure, so as to yield only a minuscule (i.e., nearly undetectable) loss of capacitance when voltage breakdown occurs.

SUMMARY OF THE INVENTION

An object of the present invention is to provide a capacitor which exhibits graceful failure, and a method for fabricating such a capacitor, both of which overcome many of the disadvantages of the prior art.

Another object of the present invention is to provide a capacitor which self-heals when a portion of its dielectric causes a localized short. A feature of the capacitor is that the dielectric portion, and the immediately adjacent electrodes, fail open and become electrically isolated from the remaining electrodes and dielectrics. An advantage of the invention is that many failures are needed to observe a measurable loss (typically 5–10 percent) down from initial capacitance values.

Another object of the present invention is to provide a capacitor which exhibits a controlled loss of capacitance upon localized breakdown events in the dielectric. A feature of the invention is the juxtaposition of a thin metal electrode in close spatial relationship to a ceramic-containing dielectric having loci of impurities. An advantage of the invention is that the resulting ceramic-containing capacitor exhibits high dielectric constants relative to metallized polymer capacitors but continues to operate in a fail open mode even after several instances (more than 1000) of micro short circuiting.

Yet another object of the present invention is to provide a method for fabricating a capacitor which is immune to a fail short phenomenon when operating below a predetermined voltage. A feature of the method of fabrication is subjecting the capacitor to the predetermined voltage for a time sufficient to induce mini-arching across loci of dielectric impurities found in dielectric, said loci juxtaposed intermediate two electrically conducting electrodes in the capacitor. This process removes those loci from the capacitor construct. An advantage of the method is the ability to tailor a capacitor to be operational at a certain voltage less than the predetermined voltage.

Briefly, the invention provides a ceramic capacitor comprising a first self-supporting electrode comprising a metallic substrate; a layer of a ceramic deposited on said first electrode to form a dielectric volume; and a uniform metallic layer deposited on a surface of said dielectric volume to form a second electrode, said metallic layer having a thickness such that a voltage breakdown to regions of said metallic layer will cause the regions to evaporate.

The invention also provides a method for fabricating a capacitor exhibiting gradual failure below a predetermined voltage, the method comprising supplying a metallic, planar substrate having a first thickness, a first surface and a second surface; overlaying the first surface with a dielectric comprised of ceramic to form a ceramic surface, wherein portions of the ceramic surface have loci of impurities; depositing a uniform metallic film on the ceramic surface to a second thickness; and subjecting the uniform metallic film to a voltage above the predetermined voltage and for a time sufficient to evaporate regions of the film overlaying the loci.

BRIEF DESCRIPTION OF THE DRAWING

The invention together with the above and other objects and advantages will best be understood from the following detailed description of the preferred embodiment of the invention shown in the accompanying drawing, wherein.

DETAILED DESCRIPTION OF THE INVENTION

The present invention is a film-on-foil ceramic capacitor which does not "fail-short", (i.e. does not exhibit a rapid and complete breakdown in capacitance function) but rather, exhibits graceful failure, i.e., a gradual loss in capacitance over time. The capacitor continues to function even after several hundred to several thousand discreet localized breakdowns occur in its electrode or electrodes because each of these localized breakdowns or faults, microscopic in scale, electrically disconnect from the remaining electrode and structure. The capacitor is only considered to have failed at such time that a predetermined or defined leakage current or dielectric loss is reached, and both of these occur after a large number of breakdowns. The present invention also provides a method for fabricating such a capacitor.

The present invention concerns capacitors and a capacitor fabrication method which provide configurations whereby ceramic dielectrics incorporated therein have thicknesses as low as 0.1 microns. Metal electrodes with comparable thicknesses are also provided. Compared to standard thickness ceramics, the invented thin ceramic dielectric design confers high capacitance for a given dielectric area (but without the aforementioned associated brittleness), per the following equation:

$$Q \sim \left(\frac{\epsilon A}{4\pi d}\right) V$$

where Q is charge, $\epsilon$=dielectric constant, A is area of dielectric, V is voltage, and d is the distance between electrodes.

Fabrication Detail

Ceramic capacitors commonly use ferroelectric materials as dielectrics. Ferroelectric materials are ionic crystals which exhibit a spontaneous dipole moment, and thus a spontaneous electrical polarization, which can be reversed if an electric field larger than the coercive field is applied. Several ferroelectric materials are suitable dielectrics for use in the invented capacitor, including, but not limited to oxides such as $(Pb,La)(Zr,Ti)O_3$ (annotated as PLZT), $BaTiO_3$, and combinations thereof.

Figure 1:
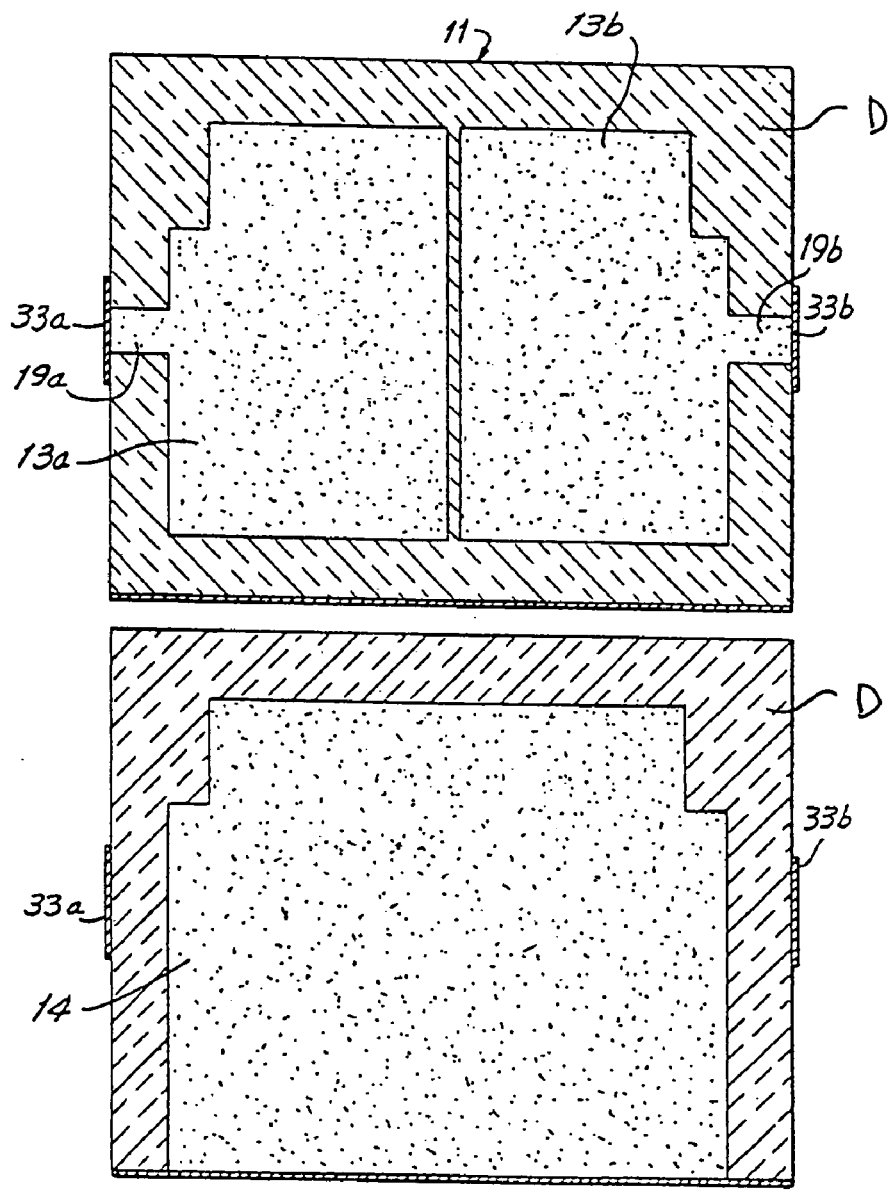
FIG. 1 is a schematic view of a prior art ceramic capacitor that fails gracefully.
Figure 2:
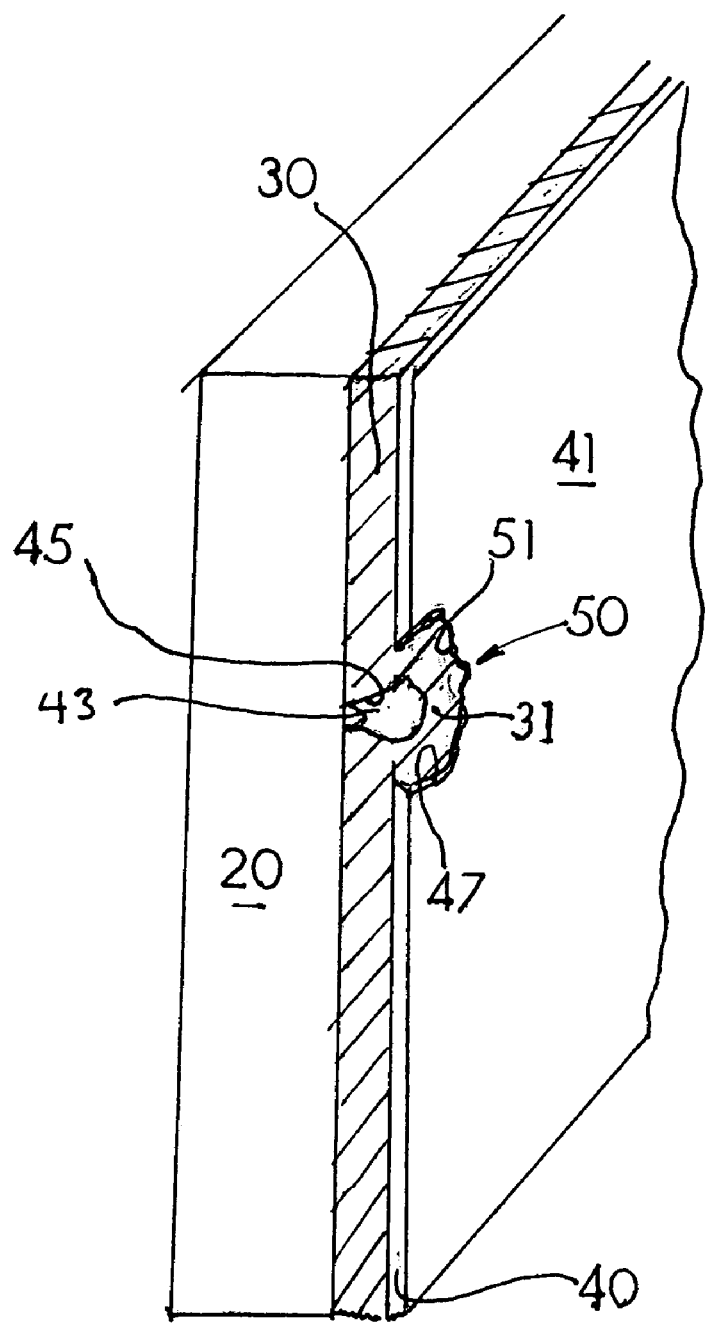
FIG. 2 is a schematic view of a ceramic capacitor that fails gracefully, in accordance with features of the present invention.

Referring to FIG. 2, the structure of the invented ceramic capacitor 10 consists of a dielectric slab 30 sandwiched between two metal electrodes. The first electrode 20 provides the mechanical support for the capacitor structure. Typically, the first metal electrode 20 comprises a metal foil such as an approximately 0.5 mm thick Ni foil, but foils as thin as 0.05 mm can be used. Other metallic materials of comparable conductivity and rigidity can also be used. Suitable metallic material alternatives include, but are not limited to, copper, aluminum, stainless steel, and combinations thereof.

In the alternative, the first electrode 20 may comprise a thin layer of metal deposited on an insulator substrate, such that the insulator substrate also serves as mechanical support for the capacitor construct.

On the first electrode 20 is deposited a ceramic layer 30 such as an approximately 0.7 microns thick layer of the dielectric PLZT. Other ceramic dielectrics, especially metal oxides, are suitable. This deposition is accomplished by standard chemical deposition techniques. The 0.7 microns thickness of the dielectric allows operation of the capacitor at voltages of 60 Volts or more. Depending on the voltage the capacitor is to sustain, the thickness of the dielectric may be chosen between 0.1 and 4 microns. Deposition of the ceramic layer results in the formation of a ceramic layer surface.

A metal film comprising a second electrode 40 of between 0.01 and 0.1 microns thick is deposited on designated regions of the ceramic layer surface 31 or over substantially the entire ceramic surface 31. (The inventors have observed self clearing in platinum top electrodes less than 100 nanometers thick.) What results is a substantially defect-free, uniform metal film 40 and surface 41 overlaying predetermined portions of the dielectric surface 31.

The deposition of the second electrode 40 is accomplished by any means which provides layers of uniform thicknesses. These deposition techniques include, but are not limited to, sputtering, thermal evaporation, electron beam evaporation, and combinations thereof. A preferable means for deposition is via the use of a shadow mask, which is a stencil through which the metal is deposited to define a desired geometry. Aside from the deposition of several discreet electrodes on top of a dielectric surface, in the alternative, "blanket electrodes" are suitable. Blanket electrodes are therefore utilized to cover substantially the entire surface of the dielectric.

Metals having low vaporization temperature can be used for the second electrode, including, but not limited to Aluminum, Platinum, Copper, Zinc, Silver, or Gold and combinations thereof. Appropriate top electrode material is selected based on the characteristics of the capacitor and its operation parameters, e.g. dielectric constant, voltage, thickness, and metal vaporization temperature, which are empirically determined, or else determined based on ultimate application of the capacitor.

Given the absence of fusing strips, or other complex electrode structures, one has great latitude in selecting the geometry of the second electrode. As such better form factors are possible for the capacitor in the circuit design. Additionally, unique geometries to obtain a very specific capacitance incorporated. When implemented in a discreet packaged capacitor, these capacitors would have a smaller volume, inasmuch as the additional volume consumed by a fusing element is not needed.

For planar capacitors, an electrode of unspecified geometry can be deposited and then laser trimmed to obtain a very specific capacitance, analogous to trimming of thin film resistors. This is especially useful for high frequency applications. Such freedom in electrode design, and therefore known capacitance, permits more compliant circuit design and offers the circuit designer more latitude.

Operation Detail of the Device.

Figure 3:
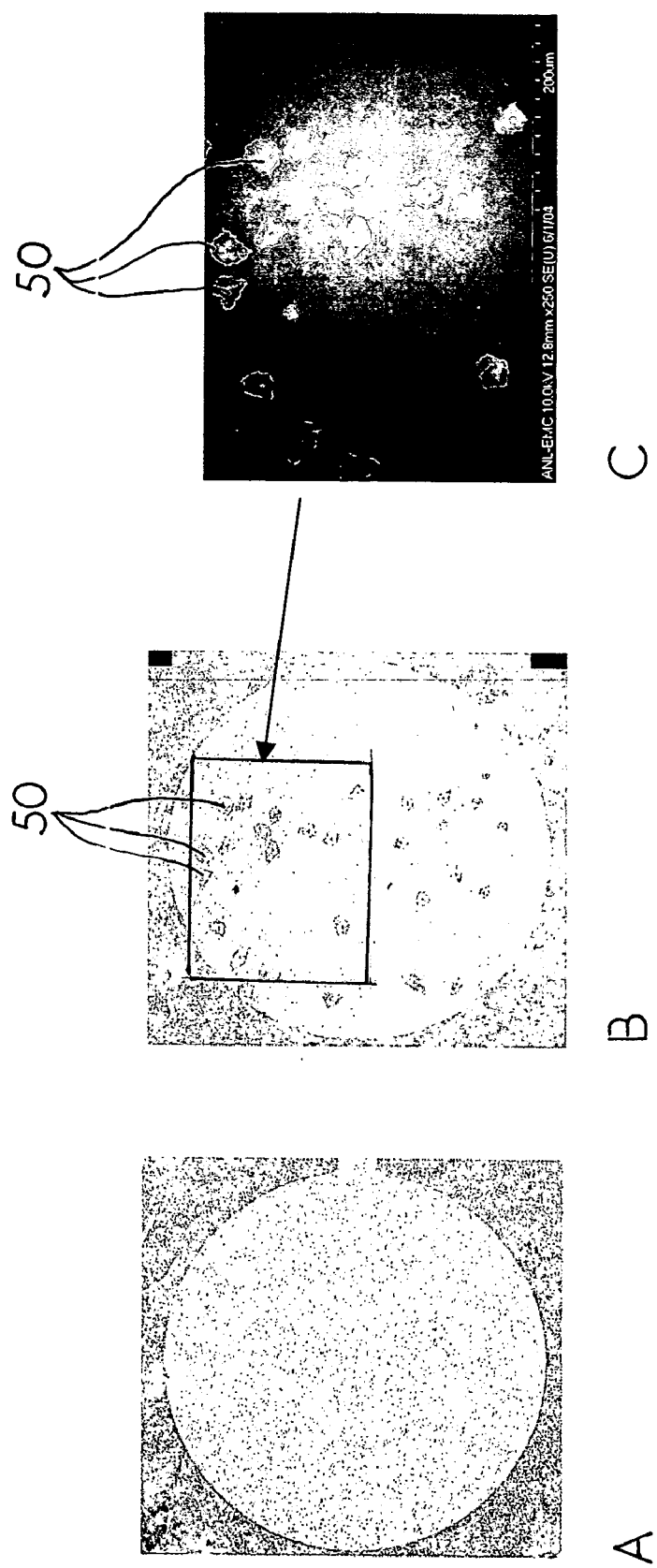
FIGS. 3A–C is series of photomicrographs showing an electrode before and after the formation of apertures in the thin film electrode of the invented capacitor, in accordance with features of the present invention.
Figure 4:
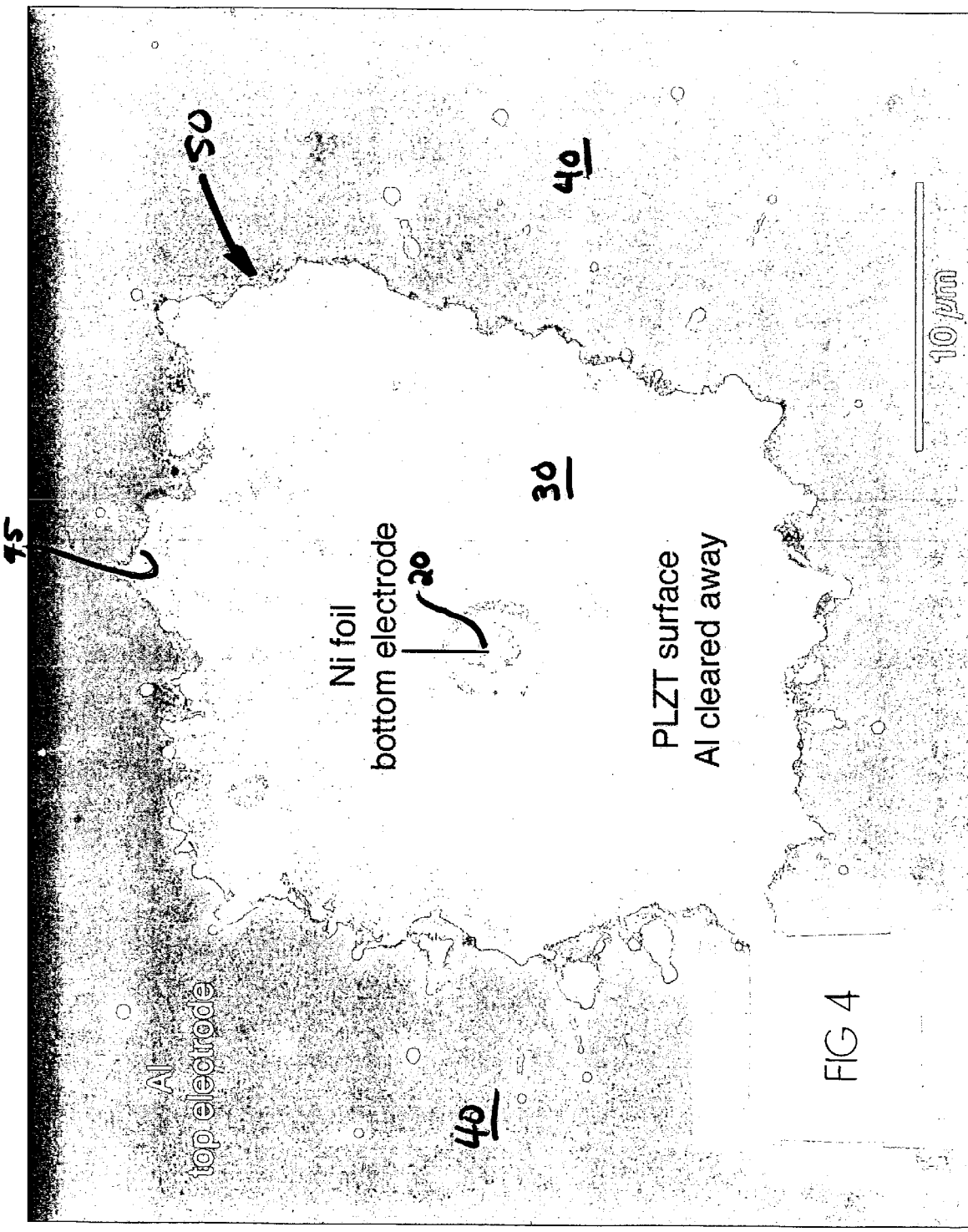
FIG. 4 is a photomicrograph of a micro-region of a Al/PLZT/Ni capacitor in electrical isolation from the remaining capacitor, in accordance with features of the present invention.

Surprisingly and unexpectedly, the inventors found that when dielectric breakdown occurs in a "weak" area, the ceramic dielectric discharges its stored energy in that spot. This discharge of energy does two things: 1) It melts, vaporizes, sinters or blows back the dielectric; and 2) It produces enough heat in the localized region of the breakdown that it causes the electrode(s) in that area to be vaporized. This phenomenon results in localized discharge and clearing of the effected region of the capacitor. FIGS. 3 and 4 show photomicrographs of the mini-arcing phenomenon.

FIG. 3A depicts a view of a pristine electrode with an aluminum top electrode film (at 10 nanometer thickness), a PLZT dielectric, and a nickel bottom electrode. FIG. 3B shows the top electrode after having been subjected to high voltage and undergoing several self-clearing events. The electrode displays several eruptions in the top electrode film. The center 20 of those eruptions reveals the bottom electrode foil. Ringing the center 20 is a region 30 depicting the ceramic dielectric. It is noteworthy that the capacitor containing the top electrode with self-clearing breaches is still operational, with no appreciable loss in capacitance. FIG. 3C is an expanded view of FIG. 3B and more clearly shows the top metal electrode 40 cleared from the breakdown area.

FIG. 2 schematically depicts a single clearing event, with FIG. 4 a photomicrograph of same. The event, and eventual aperture 50 or hole in the thin-most electrode 40 is reminiscent of a crater and typically marks the exact spot of localized dielectric breakdown.

A salient feature of the invented capacitor is the thinness of the second electrode 40 relative to the first electrode 20. The key limitation is the breakdown strength of the area of the dielectric underlaying the second electrode 40. Since the dielectric contains a random distribution of faults (due to impurities, dopants, fabrication anomalies, or uneven distribution of internal stresses), when a voltage is reached such that one region of the dielectric undergoes dielectric breakdown, it will discharge and clear-away a portion of the electrode in close spatial relationship to it, thereby forming the electrode aperture or hole 50. This aperture is typically formed via vaporization of the metal film overlying the fault locus of the dielectric, said vaporization caused by the arc temperature. While voltage is no longer maintained in that particular fault region, because of the absence of overlying portion of the electrode 40, the voltage is still maintained across the rest of the capacitor. In a subsequent or serial application of voltages, or if the voltage is increased, dielectric breakdown is facilitated in some other area of weakness. Then that second area will be cleared, and so on until a defined failure point is reached. The inventors have found that thousands of failures can occur with no appreciable degradation in capacitance of the device.

Only one electrode need be thin enough to be cleared away as a result of the micro-arcing which occurs from dielectric failure. (In a preferred embodiment, the thick metal foil support is the bottom electrode and this electrode is unaffected.) However, both electrodes can be fabricated of sufficient thinness to effect electrode removal on both sides of a weak locus region of dielectric. At voltages sufficient to generate breakdown in the dielectrically weak area, dielectric breakdown occurs in a defined localized area, with an electric arc extending transversely across the capacitor. This leads to a discharge of the stored energy in that localized area of the dielectric between the closest two points of opposing surfaces of the first electrode 20 and the second electrode 40.

As noted supra, the discharge is sufficient to result in localized heating of the immediate area. This heat provides a means for the thin metal top electrode 40 to be vaporized in the adjacent area and to be physically "cleared" away from the defect site. Frequently, the ceramic in the discharge path is cleared away as well. This "self-clearing" process occurs on the order of microseconds. The cleared area of the metal top electrode is on the order of a few (~20) microns in diameter. When punch-through does occur in the dielectric, the diameter of the resulting dielectric tunnel is on the order of 1 to 3 microns.

The arcing temperature is a function of many variables including, but not limited to, the dielectric constant of the ceramic, the applied voltage, thermal conductivity, and the ramp rate of the voltage.

FIG. 4 depicts a region of an Al/PLZT/Ni capacitor which experienced the micro-arcing phenomenon discussed in the above paragraph. FIG. 4 shows a micro-crater caused by the arcing event. The underlying electrode 20 in this instance is nickel, and is clearly visible at the center of the crater. The fact that the underlying electrode 20 is visible indicates that a portion of the PLZT dielectric, corresponding to a locus of ceramic impurities which was melted, vaporized or otherwise removed by the arcing, so as to form a tunnel 43 from the surface of the underlying electrode to the surface 31 of the dielectric layer 40.

The morphology of the remaining (i.e., post-arcing) dielectric at the former weak-locus site indicates that the dielectric is sintered PLZT, which is to say that the dielectric is blown back and undergoes a consolidation at high temperature associated with arcing temperatures. This consolidation manifests as a solidification of the dielectric along the inside surfaces 45 of the tunnel 43, and at the margins 51 of the hole in the top electrode 40 where the dielectric abuts with the edges 47 of the electrode 40. This solidification/sintering of the ceramic dielectric provides additional means for electrically isolating the region of the previous (and now eliminated) fault locus from the remainder of the electrode 40 and capacitor.

The portion of the top electrode heretofore overlaying the impurity loci of the dielectric is now nonexistent, the result of vaporization occurring from the mini-arcing. FIG. 4 depicts the diameter of the resulting aperture in the top electrode 40 of about 20–30 microns. The tunnel of dielectric is located approximately in the center of the aperture in the top electrode. The extent of cleared area in the top electrode will depend on may factors including the thermal conductivity of the ceramic and metal, the vaporization temperature of the metal, the dielectric constant of the ceramic, the applied voltage, etc.

Due to the "self-clearing" of the top metal electrode away from the defect site, the breakdown region is electrically isolated and removed from the remainder of the capacitor structure. The capacitor continues to operate, in post-benign failure mode, holding the same voltage as before, or can be operated at even higher voltages, with only a miniscule, nearly immeasurable, loss in capacitance. A small loss of capacitance, or rise in leakage current or dielectric loss, is observed only after several breakdown and clearing events have occurred. The inventors have found that hundreds to thousands of such clearings are required to cause a loss in capacitance of a few percent.

The capacitor continues to isolate these dielectric-fault loci (i.e., self-heal) as breakdown events arise. Detectable failure is said to have occurred only after a rise in leakage current or dielectric loss to a predetermined value (as determined by the application or manufacturer) occurs after several "self-clearing" events over time. The capacitor is thus said to exhibit "graceful failure" since rather than an instantaneous failure via short circuit, the capacitor suffers a progressive gradual loss in performance until such time that the defined failure point is reached.

Generally, only 10–30 micron-diameter regions of the thin-most electrode of the capacitor continue to serially evaporate upon serial applications of the voltage without any appreciable loss in capacitance. This compares with state of the art electrode designs whereby entire swaths of electrode areas are lost in a break-down event.

As an alternative to constructing the capacitor and then subjecting same to voltage spikes during the course of its use, a burn-in process is utilized. In this scenario, the capacitor, once constructed, is subjected to a predetermined voltage (say "X") known to cause microbursts throughout the top electrode in a single "burning-in" step, or a plurality of steps. The application of this predetermined "burn in" voltage serves as a means for clearing all loci of imperfections (from whatever causes) that reside in the dielectric layer 30. This manufacturing process allows the capacitor to be rated as fail safe and in fail open mode at a voltage below the aforementioned predetermined burn-in voltage "X". Also, capacitors subjected to this pre-use, burn-in process will not suffer any further, appreciable degradation of capacitance with voltage cycling.

Utilization of the Device

The confined 'self-clearing' of faults prevents sudden voltage spikes in the associated circuitry. The fact that several hundreds to thousands of discharges do not affect the characteristics or functioning of the invented capacitor makes this capacitor especially suitable for use in situations where capacitors cannot be replaced easily or where a shirt circuit failure will result in catastrophic failure of the circuitry.

The instant device and fabrication method provides a high energy density, fail safe capacitor. This includes space missions, battlefield situations, hybrid vehicles, and a myriad other industrial or communications applications.

While the invention has been described with reference to details of the illustrated embodiments, these details are not intended to limit the scope of the invention as defined in the appended claims.

The invention claimed is:

1. A ceramic capacitor comprising:
   a) a first self-supporting electrode comprising a metallic substrate;
   b) a layer of a ceramic deposited on said first electrode to form a dielectric volume and dielectric surface; and
   c) a uniform metallic layer deposited on said dielectric surface to form a second electrode, said metallic layer having a thickness such that an application of a predetermined voltage to regions of said metallic layer will cause the regions to evaporate wherein said regions are in close spatial relationship to portions of said ceramic layer containing impurities.

2. The capacitor as recited in claim 1 wherein the regions serially evaporate upon serial applications of the voltage above a predetermined value.

3. The capacitor as recited in 1 wherein said first electrode is thicker than the second electrode.

4. The capacitor as recited in claim 1 wherein the second metallic electrode is between 0.01 and 0.1 microns thick.

5. The capacitor as recited in claim 2 wherein the first electrode is more than 0.1 mm thick.

6. The capacitor as recited in claim 1 wherein the dielectric is an oxide.

7. The capacitor as recited in claim 1 wherein the dielectric is selected from the group comprising $(Pb,La)(Zr,Ti)O_3$, Barium titanate, and combinations thereof.

8. The capacitor as recited in claim 1 wherein said voltage exceeds 60 Volts.

9. The capacitor as recited in claim 1 wherein the second electrode is a metal chosen from the group consisting of Aluminum, Platinum, Gold, Copper, Silver, Zinc, and combinations thereof.

10. The capacitor as recited in claim 1 wherein the dielectric is a ferroelectric.

11. The capacitor as recited in claim 1 wherein said dielectric has a thickness of between 0.3 and 4 microns.

12. The capacitor as recited in claim 1 wherein the second electrode metallic layer is deposited through vaporization.

13. The capacitor as recited in claim 1 wherein the first electrode is more than 0.1 microns thick and the second electrode layer has a thickness which is between 0.01 and 0.1 microns.

14. A method for fabricating a capacitor exhibiting gradual failure below a predetermined voltage, the method comprising:
  a) supplying a metallic, planar substrate having a first thickness, a first surface and a second surface;
  b) overlaying the first surface with a dielectric comprised of ceramic to form a ceramic surface, wherein portions of the ceramic surface have loci of impurities;
  c) depositing a uniform metallic film on the ceramic surface to a second thickness; and
  d) subjecting the uniform metallic film to a voltage above the predetermined voltage and for a time sufficient to evaporate regions of the film overlaying the loci.

15. The method recited in claim 14 wherein the voltage is more than 60 Volts.

16. The method recited in claim 14 wherein the first thickness is greater than the second thickness.

17. The method recited in claim 14 wherein the first thickness as thin as 0.1 microns.

18. The method as recited in claim 14 wherein the first thickness is more than 0.1 micron and the second thickness is between 0.01 and 0.1 microns.

19. A capacitor formed from the method recited in claim 14.

* * * * *